Sept 17, 1957  E. W. GOLDBERG  2,806,309
PHOTOGRAPHIC SLIDE BINDER
Filed June 4, 1952
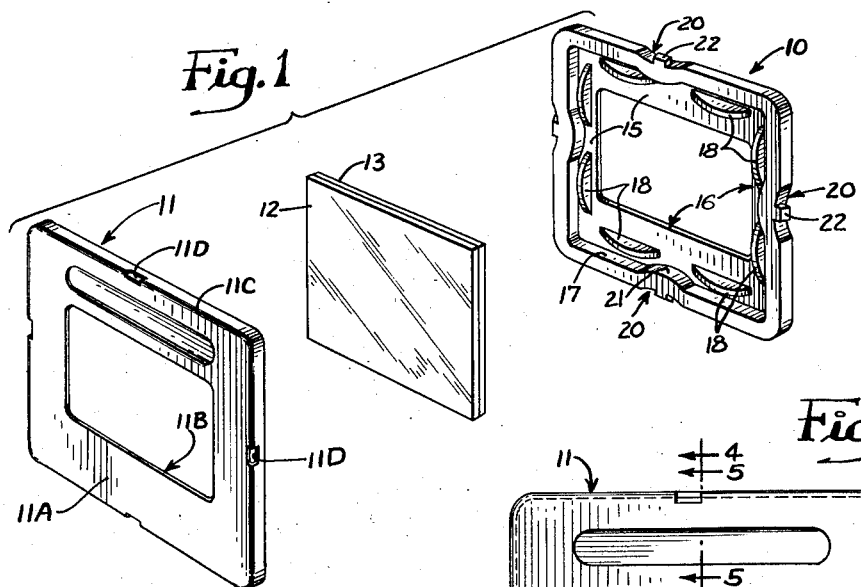
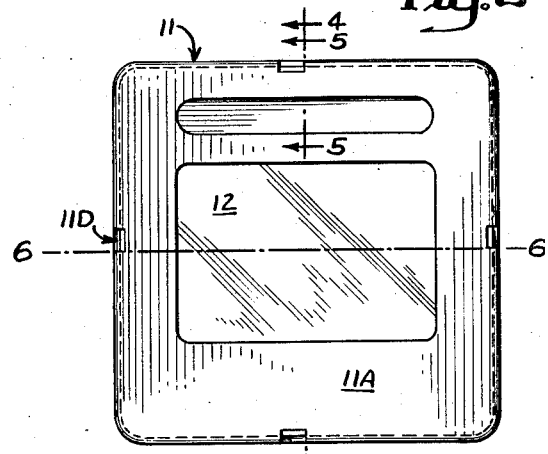
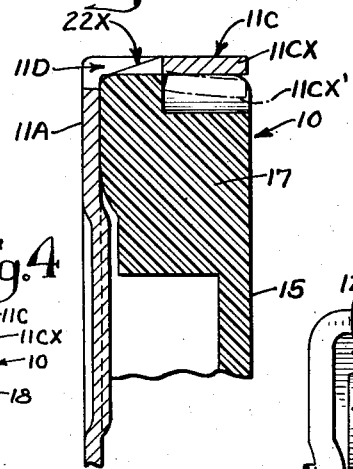
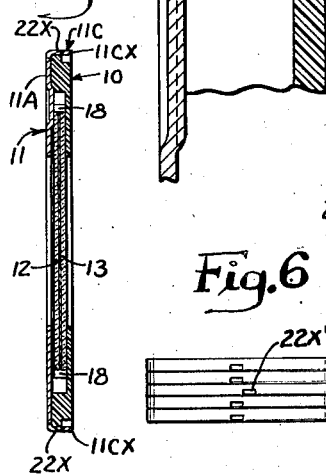
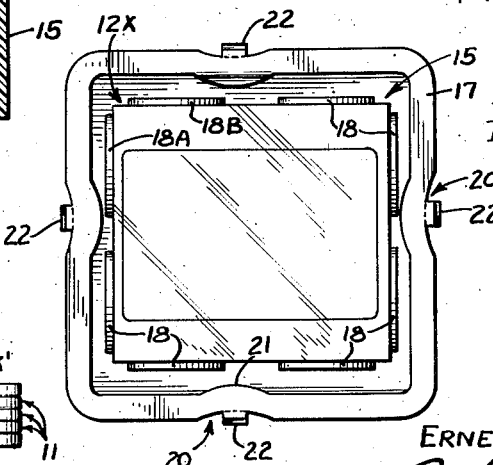
INVENTOR.
ERNEST W. GOLDBERG
BY
atty.

United States Patent Office 2,806,309
Patented Sept. 17, 1957

2,806,309
PHOTOGRAPHIC SLIDE BINDER

Ernest W. Goldberg, Wilmette, Ill., assignor, by mesne assignments, to Minneapolis-Honeywell Regulator Company, a corporation of Delaware Application June 4, 1952, Serial No. 291,680

4 Claims. (Cl. 40—152)

The principal object of this invention is the provision of an improved slide binder or holder for films and transparencies such as are used in stereopticon and like picture projectors.

The improved slide binder is characterized by a number of features including the provision of a two-piece construction consisting of a base part fabricated from a plastic material and a cover part fabricated from a suitable heat-reflecting or dissipating metal which is also easily deformable in certain respects.

Another feature consists in the provision of certain glass-positioning and protecting lugs on the more yieldable plastic base member to protect the corners of the glass against breakage from various causes.

Another feature is the provision of cooperative locking formations on both the base member and the cover member for optional use to secure these members together in relatively temporary or permanent conditions.

Another feature is the provision of structural features making the new binder substantially dust-proof.

Still another feature is the location of the aforesaid locking formations in a certain characteristic positioning about the rim of the binder for ascertaining by touch the orientation of the binder and whether the metal side is foremost or not, as well as whether the picture is upside down or otherwise, and for detecting visually whether one slide in a stack is improperly oriented.

Additional features of novelty and utility relate to details of the construction and operation of the embodiment described hereinafter in view of the annexed drawing, in which:

Fig. 1 is an exploded perspective view of the binder components in relative positions of assembly;

Fig. 2 is a front elevational view of the metallic side of the binder;

Fig. 3 is a front elevational view of the plastic binder base with a glass positioned therein;

Fig. 4 is a sectional detail looking in the direction of lines 4—4 of Fig. 2;

Fig. 5 is an enlarged, fragmentary, sectional detail of the novel locking means as seen along lines 5—5 of Fig. 2;

Fig. 6 is an edgewise view of a small stack of slides to illustrate the off-register indicating function of certain locking means.

Referring to Fig. 1, the novel binder consists of a molded base member 10, a complementary die-stamped metal cover member 11, and the usual pair of cover glasses 12 and 13 between which the usual picture transparency (not shown) is sandwiched.

The base member 10 is fabricated by molding process from a suitable heat-stable plastic selected from the phenolic group, and includes a bottom-wall section 15 in which is formed a large cut-out or window 16.

The bottom wall is surrounded by a thick rim 17 defining a well or seat into which the pair of glass plates 12—13 (and an included transparency) are fitted.

Formed in spaced relation in a rectangular array around the inside of the bottom wall 15 are glass-positioning and protecting ribs or lugs 18 (see also Fig. 3). These lugs are situated along a line which lies between the inside face of the rim 17 and the margin of the window 16 in a sense which is circumambient of the window.

The window 16 is conventionally rectangular, as are the glass plates 12—13, and it is a feature of the construction that a pair of spaced lugs 18 will be located to adjoin each corner angle of the window and define a right angle as in the manner of the two lugs 18A, 18B, especially indicated in Fig. 3, with the spacing between said lugs (and all similar corner pairs) at the apex of the right angle.

The latter construction of the spaced corner-defining pairs of lugs, such as 18A, 18B, is important in that it affords corner openings into which the corner edges 12X (Fig. 3) of the glass plates project free of contact with the lugs or other binder parts, as a protective feature against breakage from dropping and like abuse.

The critically spaced pairs of lugs or ribs 18, being integral with the plastic base member, afford a relatively soft back-stop for the glass when compared with metal lug arrangements heretofore in common use.

Moreover, the plastic lugs 18 are purposely made as narrow as possible to afford some yieldability both to protect the glass in the manner of shock absorbers, and for the purpose of permitting a limited movement to admit glasses which may have some edgewise irregularity in dimension. Compared with metal bases, the coefficient of expansion of the plastic base produces less distortion under the heat conditions encountered in picture projectors.

Another feature of the molded base structure is the provision of recesses or indentations 20 (Fig. 1) at certain off-center locations around the outside of the rim 17. These recesses are arcuate or concave and are each accompanied by a convex reinforcing projection 21 on the inside of the rim (see lower part of Fig. 3 also).

In each concave recess 20 there is positioned an integral locking finger 22 adapted to cooperate with a locking formation in the cover plate in a manner to be described.

At this juncture, another important feature of the new construction is emphasized, namely, the offset location of the concave locking recesses 20 and their respective locking fingers 22.

In Fig. 2 it will be observed that the section line 4—4 lies on the vertical center line or axis of the rectangular slide binder, while the dash-dot line 6—6 corresponds to the central horizontal axis therethrough; and all of the recesses 20, and hence all of the fingers 22, lie respectively to the left of said axis.

Referring again to Fig. 1, the binder structure is completed by the metal cover 11, which is preferably constructed of a soft, deformable, and heat-reflecting metal such as aluminum.

The cover plate consists of a flat bottom wall portion 11A in which is formed a window 11B adapted to register with the window in the base member. A rim or flange 11C surrounds the bottom wall and is adapted to fit closely over the base rim 17 in the manner illustrated particularly in Fig. 5.

Finger-receiving slots 11D are formed in each side rim portion 11C of the cover plate and positioned off-center in the same manner as the fingers 22, so as to overlie the latter in the manner shown in Fig. 5 at 22X.

Moreover, each finger 22 is located at the inner margin of its corresponding concave locking recess, as shown in Fig. 5, and the top of each finger is sloped as at 22X, to rise from the front toward the rear of the base so as to provide a pitched leading face to facilitate slippage of the cover rim in seating onto the base rim.

It will be noted in Fig. 5 that a portion of the cover rim 11CX locks behind the appertaining finger, as at 22X, and this engagement is sufficient to hold the cover member in place for all normal usages; but for purposes of description such engagement is regarded as "temporary."

A more "permanent" locking may be effected by pushing the portion overlying any or all of the concave recesses 20 down into the latter, as indicated by the dash-dot depiction in Fig. 5 at 11CX'. For this purpose the aluminum stamping is sufficiently soft to permit easy deformation of the locking portions 11CX' both in securing and releasing the cover, as desired.

The cover plate fits snugly onto the base and the fingers 22 close up the locking slots 11D, so that the assembly is substantially dust-tight.

The glasses 12, 13 are in effect located between relatively yieldable ribs 18 with their corners unobstructed, as at 18A, 18B, Fig. 3, so that breakage from shock and the like is greatly reduced.

When the slide binders are stacked, as in a tray or magazine, all in normally aligned position ready for projection, the offset locking recesses and fingers will be situated in a straight line; and should any slide be out of alignment, the off-center locking formation will stand out of register with its neighbors, and be readily apparent to the eye (or the touch), as illustrated in Fig. 6 at 22X'.

The off-center finger and recess feature is also useful when the slides are being hand-fed into a projector in the dark, as the right or left-hand orientation of the recesses is quite noticeable to the touch with little experience.

The plastic base thus affords a relatively soft seat for the film or transparency assembly or insert, by which is meant the usual film sandwiched in between the pair of covering glasses 12, 13; while the soft metal cover member affords a heat-radiating means and a deformable member for locking purposes.

I claim:

1. A slide binder, comprising a generally rectangular base plate having an opening therein for receiving a transparency, a generally rectangular metal cover plate having a rearwardly turned flange extending integrally around the edges thereof, said base plate being dimensioned to fit within said flange and against said cover plate, said cover plate having a window therein aligned generally with said opening in said base plate, said base plate having a plurality of generally linear edges formed with a plurality of outwardly projecting catch fingers on said edges and adjacent the front of said base plate, each of said catch fingers having an inclined front portion defining a ramp sloping outwardly and rearwardly and a rear portion defining a rearwardly facing shoulder, said flange of said cover plate having a plurality of slots therein adjacent the front of said flange and aligned with said catch fingers, said flange on said base plate having a plurality of web portions extending across and defining the rear edges of said slots along the rear edge of said flange, said catch fingers being receivable in said slots with said shoulders on said catch fingers disposed immediately in front of said web portions, said web portions being deflectable outwardly by said ramps on said catch fingers to provide for movement of said catch fingers past said web portions and into said slots, and a plurality of recesses formed in the edges of said base plate immediately to the rear of said catch fingers and extending into the rear face of said base plate, said web portions of said cover plate being bendable inwardly into said recesses behind said catch fingers for secure interlocking engagement with said base plate.

2. A slide binder, comprising a generally rectangular base plate having an opening therein for receiving a transparency, a generally rectangular metal cover plate having a rearwardly turned flange extending integrally around the edges thereof, said base plate being dimensioned to fit within said flange and against said cover plate, said cover plate having a window therein aligned generally with said opening in said base plate, said base plate having a plurality of generally linear edges formed with a plurality of outwardly projecting catch fingers on said edges and adjacent the front of said base plate, said flange of said cover plate having a plurality of catch openings therein adjacent the front of said flange and aligned with said catch fingers, said flange on said base plate having a plurality of web portions extending across and defining the rear edges of said catch openings along the rear edge of said flange, said catch fingers being receivable in said catch openings, said web portions being deflectable outwardly by said catch fingers to provide for movement of said catch fingers past said web portions and into said catch openings, and a plurality of recesses formed in the edges of said base plate immediately to the rear of said catch fingers and extending into the rear face of said base plate, said web portions of said cover plate being bendable inwardly into said recesses behind said catch fingers for secure interlocking engagement with said base plate.

3. In a slide binder, the combination comprising a base plate having a generally rectangular window therein, a recess formed in the front of said base plate around said window and having a substantially flat forwardly facing bottom surface, a plurality of thin elongated ribs projecting forwardly in said recess from the bottom surface thereof and disposed in a rectangular arrangement around said window but spaced outwardly therefrom, said ribs defining a generally rectangular seat in said recess, generally rectangular cover glass means disengageably received in said seat with the edges of said cover glass means confined by said ribs, said ribs terminating substantially short of the corners of said seat and of said cover glass means, said flat bottom surface of said recess being clear and unbroken adjacent the corners of said seat and of said cover glass means, the corners of said cover glass means thereby being free of restraint to minimize breakage of said cover glass means at said corners, and a cover plate fitting over said base plate for retaining said cover glass means in said seat therein.

4. In a slide binder, the combination comprising a base plate having a generally rectangular window therein, said base plate having a recess in the front portion thereof around said window, said recess having a flat forwardly facing bottom surface, generally rectangular cover glass means disengageably received in said recess and against said bottom surface, said cover glass means having four edges with corners therebetween, said base plate having four integral wall means extending along the edges of said cover glass means and defining the edges of said recess, said wall means terminating substantially short of the corners of said cover glass means, said recess having corner portions extending outwardly substantially beyond and clear of the corners of said cover glass means, said corners of said cover glass means thereby being free of restraint so as to minimize breakage of said cover glass means at said corners thereof, and a cover plate interfitting with said base plate and retaining said cover glass means in said recess.

References Cited in the file of this patent

UNITED STATES PATENTS

| | | |
|---|---|---|
| 613,343 | Westerfield | Nov. 1, 1898 |
| 1,001,128 | Elledge | Aug. 22, 1911 |
| 1,055,453 | Durnan | Mar. 11, 1913 |
| 1,158,935 | Komorous | Nov. 5, 1915 |
| 1,811,106 | Aulbach | June 23, 1931 |
| 1,870,946 | Cutler | Aug. 9, 1932 |
| 2,292,312 | Wittel | Aug. 4, 1942 |
| 2,495,142 | Seary | Jan. 17, 1950 |
| 2,599,382 | Goldberg | June 3, 1952 |
| 2,614,354 | Winslow | Oct. 21, 1952 |
| 2,665,353 | Popp | Jan. 5, 1954 |

FOREIGN PATENTS

| | | |
|---|---|---|
| 707,500 | Germany | June 24, 1941 |
| 929,849 | France | Jan. 8, 1948 |
| 272,287 | Switzerland | Mar. 1, 1951 |